USO10661796B2

(12) United States Patent
Hajika

(10) Patent No.: US 10,661,796 B2
(45) Date of Patent: May 26, 2020

(54) LANE DEVIATION PREVENTION CONTROL DEVICE FOR VEHICLE

(71) Applicant: SUBARU CORPORATION, Tokyo (JP)

(72) Inventor: Ryo Hajika, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 45 days.

(21) Appl. No.: 16/209,694

(22) Filed: Dec. 4, 2018

(65) Prior Publication Data
US 2019/0283748 A1 Sep. 19, 2019

(30) Foreign Application Priority Data
Mar. 16, 2018 (JP) .................................. 2018-049151

(51) Int. Cl.
*B62D 6/00* (2006.01)
*B60W 30/12* (2020.01)
*B60W 50/12* (2012.01)
*G06K 9/00* (2006.01)

(52) U.S. Cl.
CPC ............ *B60W 30/12* (2013.01); *B60W 50/12* (2013.01); *G06K 9/00798* (2013.01); *B60W 2710/202* (2013.01); *B60W 2720/14* (2013.01)

(58) Field of Classification Search
None
See application file for complete search history.

(56) References Cited

U.S. PATENT DOCUMENTS 2,877,967 A * 3/1959 Markusen ............ G05D 1/0202
   244/185
4,031,527 A * 6/1977 Yanagishima ......... B60K 28/06
   340/576
6,496,759 B1 * 12/2002 Mattes .................. B60R 21/013
   180/282

(Continued)

FOREIGN PATENT DOCUMENTS

JP      63168508 A  *  7/1988
JP    2005096710 A  *  4/2005

(Continued)

OTHER PUBLICATIONS

Japanese Notice of Reasons for Refusal issued in corresponding Japanese Patent Application No. 2018-049151, dated Oct. 1, 2019, with English translation.

*Primary Examiner* — Shelley Chen
(74) *Attorney, Agent, or Firm* — McDermott Will & Emery LLP

(57) ABSTRACT

A lane deviation prevention control device for a vehicle includes a target steering torque calculator, a rate limit processor, and a rate limit value calculator. The target steering torque calculator calculates target steering torque to be applied to a steering system of an own vehicle in a lane deviation prevention control. The lane deviation prevention control includes preventing the own vehicle from deviating from a lane on which the own vehicle is traveling. The rate limit processor performs rate limit processing. The rate limit processing includes limiting a speed of change in the target steering torque to a rate limit value. The rate limit value calculator calculates the rate limit value in accordance with a deviation state of the own vehicle from the lane.

5 Claims, 7 Drawing Sheets

(56) References Cited

U.S. PATENT DOCUMENTS

| | | | | |
|---|---|---|---|---|
| 6,577,948 | B1* | 6/2003 | Skellenger | G01C 21/26 303/140 |
| 7,996,131 | B2* | 8/2011 | Yamashita | G01B 21/22 280/735 |
| 2002/0042671 | A1* | 4/2002 | Chen | B60K 28/16 701/41 |
| 2003/0023359 | A1* | 1/2003 | Kueblbeck | B60R 21/013 701/45 |
| 2004/0183663 | A1* | 9/2004 | Shimakage | G06K 9/00798 340/436 |
| 2005/0096828 | A1* | 5/2005 | Uemura | B60T 8/17557 701/70 |
| 2006/0155454 | A1* | 7/2006 | Herrmann | B60T 8/17555 701/70 |
| 2009/0088926 | A1* | 4/2009 | Yamashita | G01B 21/22 701/41 |
| 2011/0238252 | A1* | 9/2011 | Takeda | B60W 40/072 701/31.4 |
| 2012/0109460 | A1* | 5/2012 | Tokimasa | B60W 50/045 701/41 |
| 2012/0212353 | A1* | 8/2012 | Fung | B60W 30/08 340/905 |
| 2013/0063595 | A1* | 3/2013 | Niem | B62D 15/025 348/148 |
| 2015/0246687 | A1* | 9/2015 | Takeda | B62D 6/002 701/41 |
| 2015/0251656 | A1* | 9/2015 | Yester | B60W 30/09 701/41 |
| 2015/0274164 | A1 | 10/2015 | Terazawa et al. | |
| 2015/0274206 | A1* | 10/2015 | Takeda | B62D 6/008 701/41 |
| 2015/0344068 | A1 | 12/2015 | Taniguchi | |
| 2016/0001781 | A1* | 1/2016 | Fung | G16H 50/20 701/36 |
| 2016/0001810 | A1* | 1/2016 | Tsubaki | B62D 6/002 701/42 |
| 2016/0114832 | A1* | 4/2016 | Taniguchi | B62D 15/025 701/41 |
| 2016/0129934 | A1 | 5/2016 | Akatsuka et al. | |
| 2016/0280262 | A1* | 9/2016 | Oyama | B62D 15/025 |
| 2017/0043772 | A1* | 2/2017 | Watanabe | B60W 30/12 |
| 2017/0113546 | A1* | 4/2017 | Maeda | B60K 23/04 |
| 2018/0001927 | A1 | 1/2018 | Howing et al. | |
| 2018/0057054 | A1* | 3/2018 | Tokoro | G08G 1/167 |
| 2018/0170429 | A1 | 6/2018 | Shimizu | |
| 2018/0202804 | A1* | 7/2018 | Dumble | G01B 21/24 |
| 2019/0002019 | A1 | 1/2019 | Tsubaki | |

FOREIGN PATENT DOCUMENTS

| | | | |
|---|---|---|---|
| JP | 2008-230506 | A | 10/2008 |
| JP | 2010-089692 | A | 4/2010 |
| JP | 2011-230666 | A | 11/2011 |
| JP | 2013-091494 | A | 5/2013 |
| JP | 2015-189411 | A | 11/2015 |
| JP | 2015-209129 | A | 11/2015 |
| JP | 2016-064799 | A | 4/2016 |
| JP | 2016-088436 | A | 5/2016 |
| JP | 2017-013606 | A | 1/2017 |
| JP | 2017189989 | A * | 10/2017 |
| JP | 2017-202772 | A | 11/2017 |
| WO | 2014/109307 | A1 | 7/2014 |
| WO | 2017/150445 | A1 | 9/2017 |

\* cited by examiner

LANE DEVIATION PREVENTION CONTROL DEVICE FOR VEHICLE

CROSS-REFERENCE TO RELATED APPLICATIONS

The present application claims priority from Japanese Patent Application No. 2018-049151 filed on Mar. 16, 2018, the entire contents of which are hereby incorporated by reference.

BACKGROUND

The technology relates to a lane deviation prevention control device for a vehicle that executes a lane deviation prevention control including preventing the vehicle from deviating from its traveling lane.

Regarding vehicles, e.g., automobiles, there has been known a technique of providing a vehicle with a steering device such as an electronic power steering (EPS) device, and performing a steering assistance control such as a lane keeping control and a lane deviation prevention control, on the basis of exterior environment around the vehicle. The EPS device is able to control a steering angle through an electronic motor, independently of a driver's steering operation. The lane keeping control includes keeping a traveling position of an own vehicle inside a lane. The lane deviation prevention control includes preventing the own vehicle from deviating from its traveling lane. The exterior environment may be recognized by, for example, a camera or radar equipment. For example, reference can be made to Japanese Unexamined Patent Application Publication (JP-A) No. 2016-64799.

SUMMARY

An aspect of the technology provides a lane deviation prevention control device for a vehicle. The lane deviation prevention control device includes a target steering torque calculator, a rate limit processor, and a rate limit value calculator. The target steering torque calculator is configured to calculate target steering torque to be applied to a steering system of an own vehicle in a lane deviation prevention control. The lane deviation prevention control includes preventing the own vehicle from deviating from a lane on which the own vehicle is traveling. The rate limit processor is configured to perform rate limit processing. The rate limit processing includes limiting a speed of change in the target steering torque to a rate limit value. The rate limit value calculator is configured to calculate the rate limit value in accordance with a deviation state of the own vehicle from the lane.

An aspect of the technology provides a lane deviation prevention control device for a vehicle. The lane deviation prevention control device includes circuitry. The circuitry is configured to calculate target steering torque to be applied to a steering system of an own vehicle in a lane deviation prevention control. The lane deviation prevention control includes preventing the own vehicle from deviating from a lane on which the own vehicle is traveling. The circuitry is configured to perform rate limit processing. The rate limit processing includes limiting a speed of change in the target steering torque to a rate limit value. The circuitry is configured to calculate the rate limit value in accordance with a deviation state of the own vehicle from the lane.

DETAILED DESCRIPTION

In the following, some implementations of the technology are described with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same numerals to avoid redundant description.

In general, a steering control through an electric motor such as an EPS device includes rate limit processing. The rate limit processing includes limiting a torque rate, i.e., a speed of change in target steering torque, to a rate limit value. The target steering torque is to be applied to a steering system, to prevent lane deviation. The rate limit processing makes it possible to prevent the target steering torque from changing abruptly and giving the sense of discomfort to a driver.

In the existing techniques, the rate limit value is set at a single value in accordance with a vehicle speed and travel environment, e.g., a curvature, a transverse gradient, and a lane width of a road. Accordingly, the rate limit value has to be set at a large value, in order to ensure deviation prevention performance in a case of lane deviation at a large yaw angle or at a high speed.

In a case of lane deviation at a relatively small yaw angle or at a low speed, however, setting the rate limit value at the large value causes an increase in a speed of turn of a steering wheel in accordance with a change in the target steering torque at an initial stage of a start of a lane deviation prevention control. In particular, in a steering assistance system that assumes a driver who is grasping a steering wheel, there is possibility that such an increase in the speed of turn of the steering wheel may give the sense of incongruity to the driver.

It is desirable to provide a lane deviation prevention control device for a vehicle that makes it possible to limit appropriately a speed of change in target steering torque to be applied to a steering system to prevent lane deviation.

First, referring to FIGS. 1 to 6, described is a first implementation of the technology.

Figure 1:
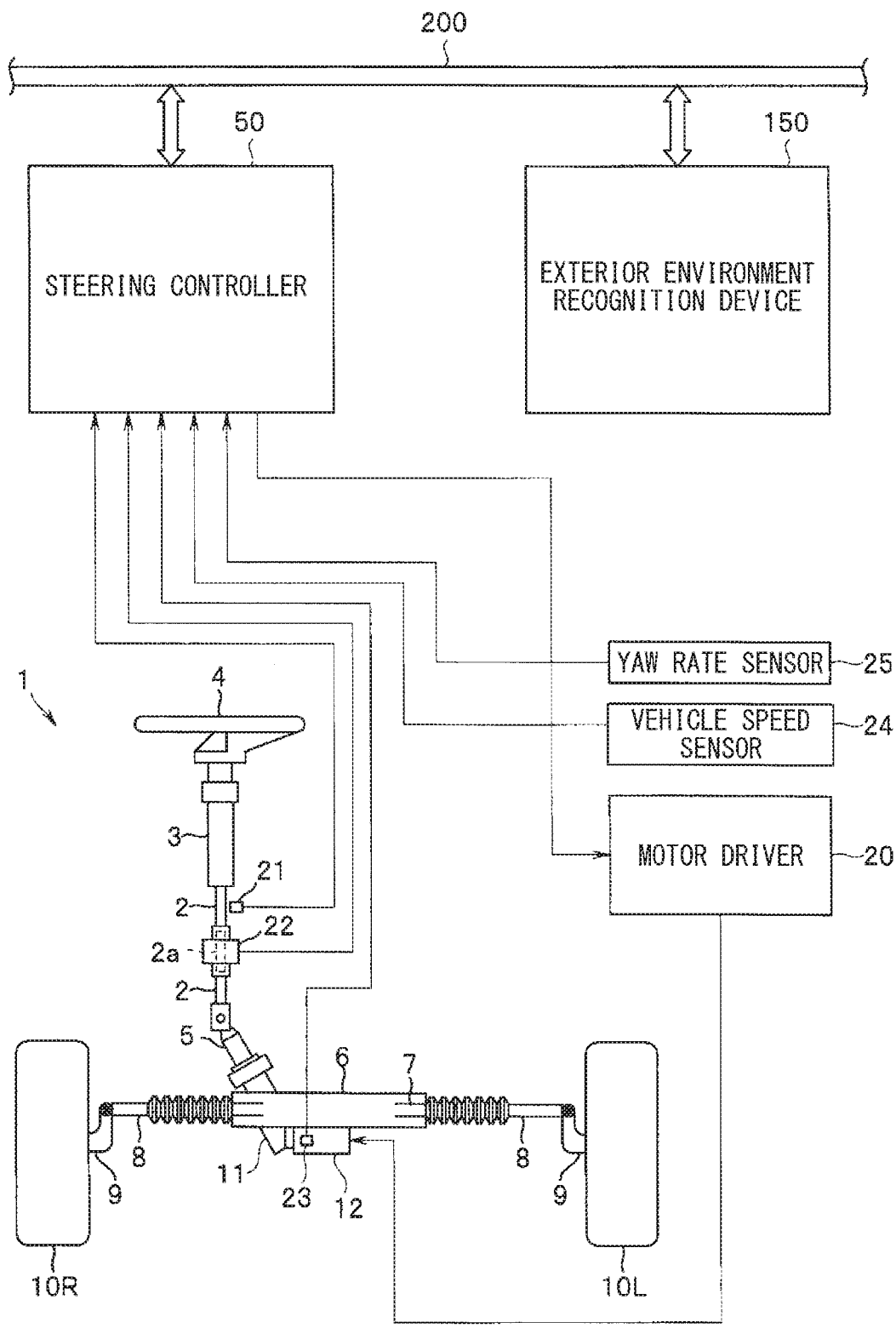
FIG. 1 is a diagram illustrating an example of a configuration of a vehicle steering system, according to a first implementation of the technology.

FIG. 1 illustrates an electronic power steering (EPS) device 1. The EPS device 1 may serve as a steering device that is able to control a steering angle through an actuator, independently of a driver's steering operation. In the EPS device 1, a steering shaft 2 may be rotatably supported, through a steering column 3, by an undepicted chassis of a vehicle, e.g., an automobile.

One end of the steering shaft 2 may be extended toward a driver's seat, while another end of the steering shaft 2 may be extended toward an engine room. A steering wheel 4 may be fixed to the end of the steering shaft 2 on side on which the driver's seat is disposed. A steering angle sensor 21 may be disposed on outer circumferential side of the steering shaft 2 to which the steering wheel 4 is coupled.

The steering angle sensor 21 may include, for example, two pairs of magnetoresistive elements, in its inside. The magnetoresistive elements may detect rotation of a magnet incorporated in a sensing gear. The steering angle sensor 21 may set in advance a reference rotation position of the steering wheel 4. The reference rotation position may be, for example, a rotation position of an upper part of the steering wheel 4 in a straight traveling state of the vehicle. Thus, the steering angle sensor 21 may be able to detect, on the basis of a variation in magnetism caused by rotation of the sensing gear, a rotation angle, i.e., a steering angle, and a rotation direction, i.e., a steering direction, from the fixed reference position set in advance.

A torsion bar 2a may be disposed in the middle of the steering shaft 2. A pinion shaft 5 may be coupled to the end of the steering shaft 2 extended toward the engine room. A torque sensor 22 may be disposed on outer circumferential side of the torsion bar 2a. The torque sensor 22 may detect dislocation caused by torsion of the torsion bar 2a. The dislocation is generated circumferentially around the steering shaft 2, between side on which the steering wheel 4 is disposed and side on which the pinion shaft 5 is disposed. Thus, the torque sensor 22 may be able to detect steering torque produced by the driver's steering operation. The steering torque produced by the driver's steering operation is hereinafter also referred to as "driver's steering torque".

A steering gear box 6 may be disposed inside the engine room. The steering gear box 6 may extend in a vehicle widthwise direction. A rack shaft 7 may be reciprocatably inserted in and supported by the steering gear box 6. The rack shaft 7 may include undepicted racks. The racks may be engaged with pinions formed on the pinion shaft 5, to form a rack-and-pinion steering mechanism.

Right and left ends of the rack shaft 7 may be protruded from respective ends of the steering gear box 6. To the protruded ends of the rack shaft 7, coupled may be front knuckles 9, through tie rods 8. The front knuckles 9 may rotatably support right and left wheels 10R and 10L as steering wheels. The front knuckles 9 may be steerably supported by the chassis. Operating the steering wheel 4 causes rotation of the steering shaft 2 and the pinion shaft 5. The rotation of the pinion shaft 5 causes rightward or leftward movement of the rack shaft 7. The movement causes the front knuckles 9 to rotate around an undepicted king pin shaft as a center, causing the right and left wheels 10R and 10L to be steered rightward or leftward.

An electric power steering (EPS) motor 12 may be coupled to the pinion shaft 5 through an assistant transmission mechanism 11. The EPS motor 12 may serve as an actuator that allows for assistance with the driver's steering operation and automatic steering. The assistant transmission mechanism 11 may include a reduction gear mechanism such as worm gears. The EPS motor 12 may be, for example, an electric motor constituted by a direct current (DC) brushless motor including a stator and a rotor. The stator may be fixed to a case. The rotor may rotate inside the stator. The rotation of the rotor of the electric motor is converted, through the assistant transmission mechanism 11, into axial movement of the rack shaft 7.

A rotation angle sensor 23 may be incorporated in the EPS motor 12. The rotation angle sensor 23 may detect a rotation angle of the rotor. The rotation angle sensor 23 may be, for example, a sensor that detects a relative rotation angle of the rotor to a predetermined zero point position by, for example, a rotary encoder. A signal from the rotation angle sensor 23 may be supplied to the steering controller 50.

It is to be noted that in the rotation angle sensor 23, initial setting of the zero point position may be provided, for example, when an ignition switch is turned to an 'ON' position. The initial setting may be based on the steering angle detected by the steering angle sensor 21 and based on a reduction ratio of the assistant transmission mechanism 11. Normally, the rotation angle detected by the rotation angle sensor 23 and the rotation angle of the steering wheel 4 detected by the steering angle sensor 21 may be dealt as the same steering angle.

The steering controller 50 may be a control unit that includes a microcomputer as its main component. The microcomputer may include, for example, a central processing unit (CPU), a read only memory (ROM) that stores, for example, programs, and a random access memory (RAM) that serves as a work area. The steering controller 50 may perform a drive control of the EPS motor 12 through the motor driver 20. The steering controller 50 may be supplied with signals from sensors and undepicted switches. Non-limiting examples of the sensors may include the steering angle sensor 21, the torque sensor 22, the rotation angle sensor 23, and other sensors including a vehicle speed sensor 24 and a yaw rate sensor 25. The vehicle speed sensor 24 may detect a vehicle speed. The yaw rate sensor 25 may detect a yaw rate, i.e., a rotation speed of the vehicle around a vertical axis.

The steering controller 50 may be coupled to a communication bus 200 that forms an in-vehicle network. To the communication bus 200, coupled may be an exterior environment recognition device 150 that recognizes exterior environment of the vehicle, to acquire travel environment information. Other undepicted controllers may be also coupled to the communication bus 200. Non-limiting examples may include an engine controller, a transmission controller, and a brake controller. The controllers are able to transmit and receive control information to and from one another through the communication bus 200.

The exterior environment recognition device 150 may recognize the exterior environment around the own vehicle on the basis of, for example, detection information of objects around the own vehicle, traffic information, positioning information of a position of the own vehicle, and high definition map information. The detection information may be acquired by various devices such as a camera and millimeter wave radar for forward recognition, and a side camera and sideward radar for sideward recognition. The traffic information may be acquired by infrastructure communication such as road-vehicle communication and inter-vehicle communication. The positioning information may be based on signals from, for example, global positioning satellites (GPS). The high definition map information may include road shape data and data for a travel control. Non-limiting examples of the road shape data may include a curvature, a lane width, and a road shoulder width of a road. Non-limiting examples of the data for the travel control may include a road azimuth angle, categories of lane lines, and the number of lanes.

In this implementation, the exterior environment recognition device 150 may mainly perform recognition of forward environment of the own vehicle. The recognition of the forward environment may be made by an on-vehicle camera and an image recognition unit. As the camera for the forward recognition, used may be a stereo camera including two cameras that capture images of an identical object from different points of view. The two cameras that constitute the stereo camera may be a shutter synchronous camera including imaging elements such as charge coupled device (CCD) and complementary metal oxide semiconductor (CMOS). The two cameras may be disposed, for example, in the vicinity of a rearview mirror inside a front windshield in an upper part of a vehicle cabin, with a predetermined baseline length.

Processing on image data from the stereo camera may be carried out, for example, as follows. First, a distance image may be generated, on the basis of an amount of dislocation between corresponding positions, in a pair of stereo images in a traveling direction of the own vehicle captured by the stereo camera. The distance image may have distance information. With the use of the distance information of the distance image, recognition of lane lines and recognition processing of three-dimensional objects may be carried out. Non-limiting examples of the lane lines may include white lane lines and other kinds of lane lines. Non-limiting examples of the three-dimensional objects may include preceding vehicles and oncoming vehicles.

In the recognition of the lane lines such as the white lane lines, changes in luminance of a road in a widthwise direction may be evaluated on the basis of knowledge that the lane lines are higher in luminance than a road surface. Thus, positions of right and left lane lines on an image plane may be identified on the image plane. A position (x, y, z) of the lane line in actual space may be calculated by a known coordinate conversion expression, on the basis of the distance information, i.e., on the basis of a position (i, j) on the image plane and parallax calculated regarding the relevant position (i, j).

A coordinate system in the actual space may be set, with reference to the position of the own vehicle. In this implementation, as illustrated in, for example, FIG. 3, the coordinate system in the actual space may have the road surface directly below a center of the camera as an origin, the vehicle widthwise direction as an x axis, a vehicle heightwise direction as a y axis, and a vehicle lengthwise direction, i.e., a direction of distance, as a z axis. At this occasion, an x-z plane (y=0) may coincide with the road surface, in a case where the road is flat. A road model may be represented, by dividing the traveling lane of the own vehicle on the road into a plurality of sections in the direction of distance, approximating right and left lane lines in each section as predetermined, and coupling the approximated right and left lane lines to one another.

For the approximation processing of the right and left lane lines, adopted may be, for example, approximation processing of the lane lines by a least square method. In one specific but non-limiting example, the lane line on left side of the own vehicle may be approximated by the least square method, as given by the following expression (1). The lane line on right side of the own vehicle may be approximated by the least square method, as given by the following expression (2).

$$x = AL \cdot z^2 + BL \cdot z + CL \quad (1)$$

$$x = AR \cdot z^2 + BR \cdot z + CR \quad (2)$$

In the expressions (1) and (2) given above, "AL" and "AR" denote curvatures of respective curves. A curvature κL of the lane line on the left side may be 2·AL. A curvature κR of the lane line on the right side may be 2·AR. Thus, a lane curvature κ may be represented by the following expression (3).

$$\kappa = (2 \cdot AL + 2 \cdot AR)/2 = AL + AR \quad (3)$$

Figure 3:
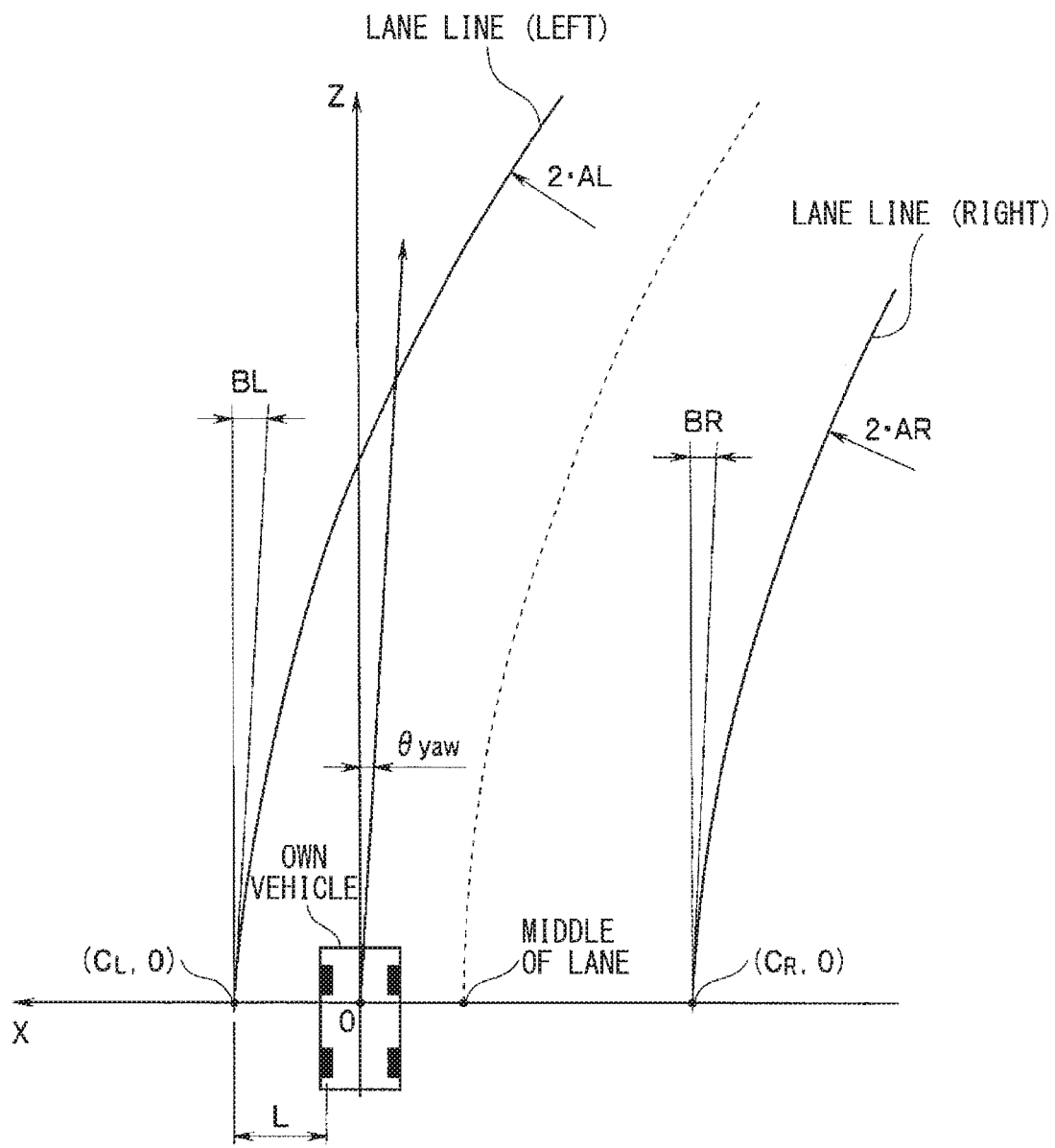
FIG. 3 is a diagram describing an own vehicle and a lane, together with various parameters, according to the first implementation.

In the expressions (1) and (2), "BL" and "BR" denote inclinations of the respective curves in the widthwise direction of the own vehicle. "CL" and "CR" denote positions of the respective curves in the widthwise direction of the own vehicle. Refer to FIG. 3.

The exterior environment recognition device 150 may further calculate a relative-to-lane yaw angle θyaw of the own vehicle, by the following expression (4).

$$\theta yaw = \tan^{-1}((BL + BR)/2) \quad (4)$$

A recognition result of the exterior environment by the exterior environment recognition device 150 may be transmitted to the steering controller 50 and other controllers. The steering controller 50 may perform a driver assistance control that includes automatic driving of the own vehicle and assisting the driver with driving. In the driver assistance control, the steering controller 50 may set a target course to be traveled by the own vehicle, from the recognition result of the exterior environment. The steering controller 50 may execute a steering assistance control, through the motor driver 20 that drives the EPS motor 12, to allow the own vehicle to travel to follow the target course. In a case with detection of steering interference by the driver's steering operation, the steering controller 50 may allow the EPS motor 12 to output assistive torque that assists the driver with the steering operation.

The target course in a steering control by the steering controller 50 may be set on the basis of the recognition result of the exterior environment by the exterior environment recognition device 150. For example, in a lane keeping control that includes allowing the own vehicle to follow a lane and keeping the own vehicle in the middle of the lane, the middle position between the right and left lane lines in a road widthwise direction may be set as the target course. The steering controller 50 may set a target steering angle that allows a middle position of the own vehicle in the vehicle widthwise direction to coincide with the target course. The steering controller 50 may control a drive current of the EPS motor 12, to allow the steering angle of the steering control to coincide with the target steering angle. It is to be noted that the target course may be set by other controllers than the steering controller 50, e.g., the exterior environment recognition device 150.

The steering controller 50 may execute not only the lane keeping control but also a lane deviation prevention control. The lane keeping control may include keeping the own vehicle in the middle of the lane. The lane deviation prevention control may include preventing the own vehicle from deviating from the lane. In one specific but non-limiting example, the steering controller 50 may calculate lane deviation estimated time Ttlc, in a case where the relative-to-lane yaw angle of the own vehicle is directed toward a direction of deviation, on the basis of information from the exterior environment recognition device 150 and on the basis of driving states of the own vehicle. The lane deviation estimated time Ttlc refers to time it takes for the own vehicle to stride over the lane line on deviation side on which deviation is to be expected. In a case where the lane deviation estimated time Ttlc is equal to or smaller than a threshold Tth, the steering controller 50 may start the lane deviation prevention control. The threshold Tth may be decided by the vehicle speed V of the own vehicle and the lane curvature κ.

The lane deviation estimated time Ttlc may be obtained by dividing a distance L from the own vehicle to the lane line on the deviation side by a deviation lateral speed Vlat as a lateral speed component of the own vehicle, as represented by the following expression (5). The deviation lateral speed Vlat may be calculated from the vehicle speed V of the own vehicle and the relative-to-lane yaw angle θyaw.

$$Ttlc = L/Vlat = L/(V \cdot \sin\theta yaw) \quad (5)$$

The lane deviation prevention control may include calculating target steering torque Tp and thereafter performing rate limit processing. The target steering torque Tp is to be applied to a steering system of the own vehicle to attain a target yaw rate γtgt. The target yaw rate γtgt may allow the own vehicle to travel along the target course. The rate limit processing may include limiting a speed of change in the target steering torque Tp to a predetermined rate limit value Lim. The lane deviation prevention control may further include, for example, performing, as appropriate, other kinds of limit processing, e.g., range limit processing, on the target steering torque Tp_lim subjected to the rate limit processing, to output the resultant torque as instruction torque that drives the EPS motor 12. The range limit processing may include limiting a maximum value of the steering torque within a predetermined range. As used herein, the steering system refers to an arrangement from the steering wheel 4 to the steering wheels through the steering mechanism.

In this case, the rate limit value Lim of the rate limit processing has to be set at a large value, in order to enhance the deviation prevention performance in a case where the deviation lateral speed Vlat of the own vehicle is high. However, in a case where the deviation lateral speed Vlat of the own vehicle is low, univocally increasing the rate limit value Lim causes the increase in the speed of turn of the steering wheel at the start of the lane deviation prevention control. This may result in possibility that the driver has the sense of incongruity or discomfort when the lane deviation prevention control starts up, in the steering assistance system that assumes the driver who is grasping the steering wheel.

Figure 2:
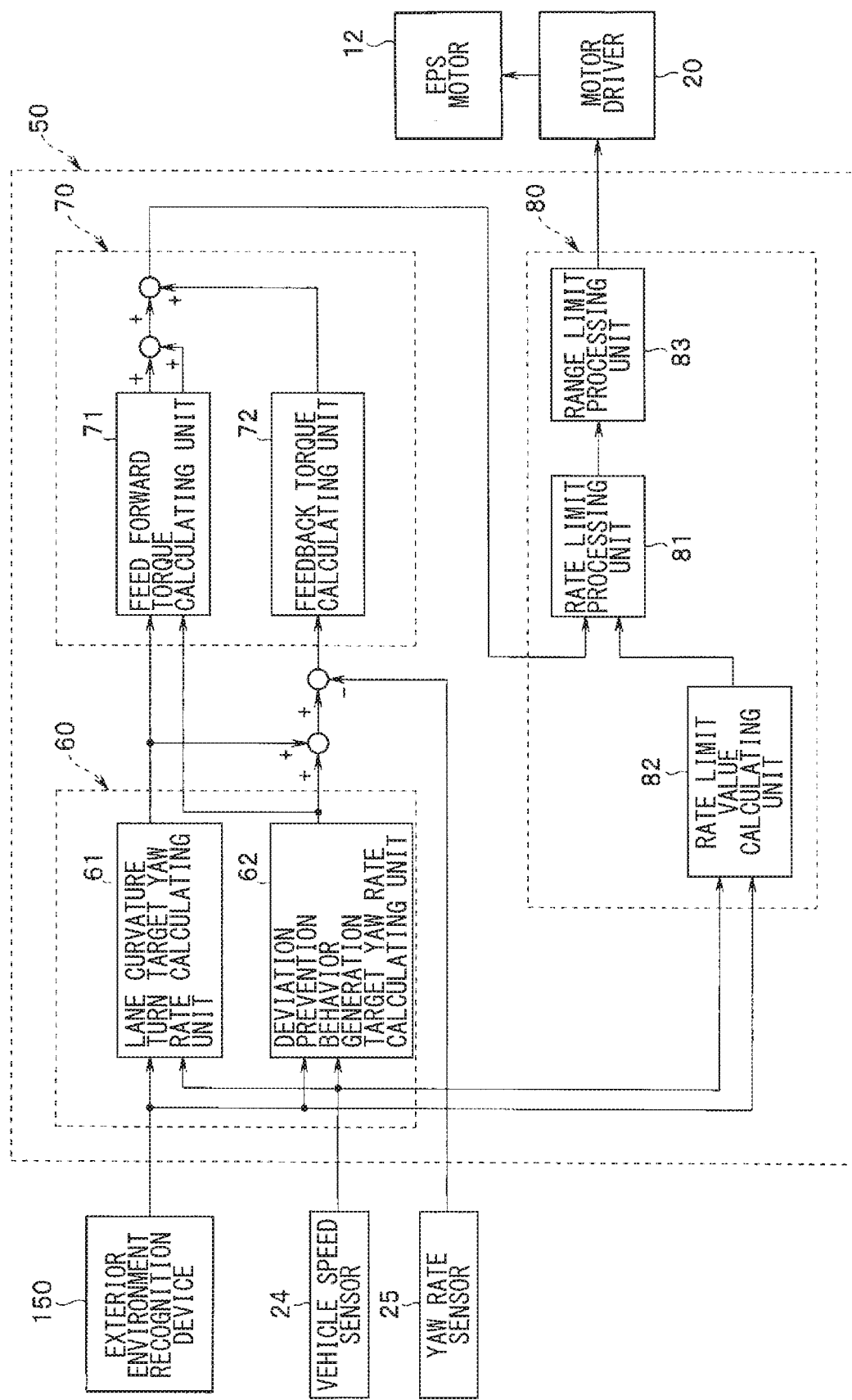
FIG. 2 is a block diagram illustrating an example of functions of a steering control system, according to the first implementation.

Thus, as illustrated in FIG. 2, the steering controller 50 may include, as its main configuration, a target yaw rate calculating unit 60, a target steering torque calculating unit 70, and a limit processing unit 80. The target yaw rate calculating unit 60 may calculate the target yaw rate. The target steering torque calculating unit 70 may calculate the target steering torque. The limit processing unit 80 may perform limit processing on the target steering torque. The target yaw rate calculating unit 60, the target steering torque calculating unit 70, and the limit processing unit 80 may serve as functional units related to the lane deviation prevention control. The limit processing unit 80 may include a rate limit processing unit 81, a rate limit value calculating unit 82, and a range limit processing unit 83. It is to be noted that this implementation gives an example where the range limit processing unit 83 is provided at a post-stage of the rate limit processing unit 81. However, the range limit processing unit 83 may be omitted.

In one specific but non-limiting example, the target yaw rate calculating unit 60 may include a lane curvature turn target yaw rate calculating unit 61, and a deviation prevention behavior generation target yaw rate calculating unit 62. The lane curvature turn target yaw rate calculating unit 61 may calculate a lane curvature turn target yaw rate γtgt_lane that serves as a target amount of turn in accordance with the lane curvature. The deviation prevention behavior generation target yaw rate calculating unit 62 may calculate a deviation prevention behavior generation target yaw rate γtgt_turn that serves as a target amount of turn that prevents lane deviation.

The lane curvature turn target yaw rate γtgt_lane and the deviation prevention behavior generation target yaw rate γtgt_turn may be added together to calculate the final target yaw rate γtgt, as represented by the following expression (6).

$$\gamma tgt = \gamma tgt\_lane + \gamma tgt\_turn \quad (6)$$

The lane curvature turn target yaw rate calculating unit 61 may calculate the lane curvature turn target yaw rate γtgt_lane, with the vehicle speed V of the own vehicle and the lane curvature κ, as represented by the following expression (7).

$$\gamma tgt\_lane = \kappa \cdot V \quad (7)$$

It is to be noted that as to the yaw rate and the curvature, a positive sign is assumed to represent a left turn. As to the relative-to-lane yaw angle, a positive sign is assumed to represent the direction of deviation from the lane line on the left side. As to a lateral position, a positive sign is assumed to represent inside the lane.

In one specific but non-limiting example, the deviation prevention behavior generation target yaw rate calculating unit 62 may calculate separately a target yaw rate γtgt_turn_1 in a deviation suppression control (relative-to-lane yaw angle θyaw≥0) and a target yaw rate γtgt_turn_2 in a posture decision control (relative-to-lane yaw angle θyaw<0). The deviation suppression control may include generating, in the own vehicle, behavior that prevents deviation, at and after the start of the lane deviation prevention control. The posture decision control may include controlling a posture of the own vehicle after the deviation suppression control until an arrival at a location of an end of the control. The target yaw rates γtgt_turn_1 and γtgt_turn_2 may be switched in accordance with the relative-to-lane yaw angle and the lateral position of the own vehicle. Thus, either one of them may be outputted as the deviation prevention behavior generation target yaw rate γtgt_turn.

The target yaw rate γtgt_turn_1 during the deviation suppression control may be calculated on the basis of the relative-to-lane yaw angle θyaw and the lane deviation estimated time Ttlc, as represented by the following expression (8).

$$\gamma tgt\_turn\_1 = \theta yaw / Ttlc \quad (8)$$

The target yaw rate γtgt_turn_2 during the posture decision control may be calculated by dividing, by target time Ttgt, a value obtained by multiplying, by a predetermined feedback gain Kyawfb, a deviation between a target relative-to-lane yaw angle θtgt_yaw at the end of the control and the relative-to-lane yaw angle θyaw during the posture decision control, as represented by the following expression (9). The target time Ttgt is time it takes to reach the target relative-to-lane yaw angle θtgt_yaw.

$$\gamma tgt\_turn\_2 = -Kyawfb \cdot (\theta tgt\_yaw - \theta yaw)/Ttgt \quad (9)$$

The target steering torque calculating unit 70 may include a feedforward torque calculating unit 71 and a feedback torque calculating unit 72. The feedforward torque calculating unit 71 may calculate feedforward torque by a feedforward control. The feedback torque calculating unit 72 may calculate feedback torque by a feedback control. As described below, the feedforward torque and the feedback torque may be added together to obtain the target steering torque.

The feedforward torque calculating unit 71 may calculate feedforward torque Tp_ff_lane that generates the lane curvature turn target yaw rate γtgt_lane. The feedforward torque calculating unit 71 may also calculate feedforward torque Tp_ff_turn that generates the deviation prevention behavior generation target yaw rate γtgt_turn.

The feedforward torque Tp_ff_lane and Tp_ff_turn may be calculated with the use of a torque conversion gain Kyawr_to_trq. The torque conversion gain Kyawr_to_trq may be obtained by referring to a map of the yaw rate and the torque conversion gain. The map may be created in advance. In other words, as represented by the following expression (10), the feedforward torque Tp_ff_lane may be calculated by multiplying the lane curvature turn target yaw rate γtgt_lane by the torque conversion gain Kyawr_to_trq. As represented by the following expression (11), the feedforward torque Tp_ff_turn may be calculated by multiplying the deviation prevention behavior generation target yaw rate γtgt_turn by the torque conversion gain Kyawr_to_trq.

$$Tp\_ff\_lane = Kyawr\_to\_trq \cdot \gamma tgt\_lane \quad (10)$$

$$Tp\_ff\_turn = Kyawr\_to\_trq \cdot \gamma tgt\_turn \quad (11)$$

The feedback torque calculating unit 72 may calculate feedback torque Tp_fb based on a deviation between the target yaw rate γtgt and an actual yaw rate γ of the own vehicle detected by the yaw rate sensor 25. In the deviation suppression control, the feedback torque Tp_fb may be calculated by a proportional integral differential (PID) control on the deviation (γtgt−γ) between the target yaw rate γtgt and the actual yaw rate γ, as represented by the following expression (12).

$$Tp\_fb = Kp \cdot (\gamma tgt - \gamma) + Ki \cdot \int (\gamma tgt - \gamma) dt + Kd \cdot d(\gamma tgt - \gamma)/dt \quad (12)$$

A proportional gain Kp, an integral gain Ki, and a differential gain Kd of the PID control in the expression (12) may be set in accordance with presence or absence of the driver's steering operation. In a case with the absence of the driver's steering operation, i.e., in a case where the torque sensor 22 does not detect the steering torque, the proportional gain Kp, the integral gain Ki, and the differential gain Kd may be set in accordance with characteristics optimally set in advance.

Meanwhile, in a case where the torque sensor 22 detects the driver's steering operation in a direction in which deviation is prevented, with the actual yaw rate overshooting the target yaw rate, the proportional gain Kp, the integral gain Ki, and the differential gain Kd may be brought to zero (0). For example, in a case of prevention of deviation from the lane line on the right side, with a value of the actual yaw rate being larger than a value of the target yaw rate, the proportional gain Kp, the integral gain Ki, and the differential gain Kd may be brought to zero (0). Thus, the feedback torque Tp_fb may be brought to zero (0), as represented by the following expression (13).

$$Tp\_fb = 0 \quad (13)$$

The feedforward torque Tp_ff_lane and Tp_ff_turn from the feedforward torque calculating unit 71, and the feedback torque Tp_fb from the feedback torque calculating unit 72 may be added together, as represented by the following expression (14), to calculate the target steering torque Tp.

$$Tp = Tp\_ff\_lane + Tp\_ff\_turn + Tp\_fb \quad (14)$$

The target steering torque Tp calculated in the target steering torque calculating unit 70 may be subjected to the limit processing in the limit processing unit 80. In this implementation, first, the target steering torque Tp from the target steering torque calculating unit 70 may be subjected to the rate limit processing in the rate limit processing unit 81. Thereafter, the target steering torque Tp after the rate limit processing may be subjected to the range limit processing in the range limit processing unit 83. The resultant torque may be outputted, as the instruction torque for the EPS motor 12, to the motor driver 20.

The rate limit processing unit 81 may perform the rate limit processing. The rate limit processing may include limiting the speed of change in the target steering torque Tp to the rate limit value Lim calculated in the rate limit value calculating unit 82. The rate limit processing may be performed as, for example, filter processing with the use of a low pass filter. The rate limit processing may include reducing, mainly, the speed of change in the target steering torque Tp to an extent that the driver is free from the sense of incongruity.

The rate limit value calculating unit 82 may use, as a base limit value, a limit value Lim_base according with the travel environment of the own vehicle. The rate limit value calculating unit 82 may make a correction of the base limit value Lim_base on the basis of the deviation lateral speed Vlat that serves as an indicator of a deviation state of the own vehicle from the lane. In this way, the rate limit value calculating unit 82 may calculate the rate limit value Lim. The base limit value Lim_base may be calculated on the basis of, for example, the vehicle speed V and the lane curvature κ.

In one specific but non-limiting example, as represented by the following expression (15), the rate limit value Lim may be calculated by multiplying the base limit value Lim_base by a rate limit value correction gain Kvlat_max according with a deviation lateral speed maximum value Vlat_max, i.e., a maximum value of the deviation lateral speed Vlat of the own vehicle.

$$Lim = Lim\_base \cdot Kvlat\_max \quad (15)$$

The rate limit value correction gain Kvlat_max may be calculated, for example, as follows. A correction gain that would make an optimal rate limit value for the deviation lateral speed maximum value Vlat_max may be obtained in advance by, for example, running tests and simulation. The correction gain thus obtained may be stored in a form of a table. Retrieval from the table makes it possible to calculate the rate limit value correction gain Kvlat_max.

It is to be noted that the deviation lateral speed maximum value Vlat_max may be maintained as a maximum value of the deviation lateral speed Vlat during an identical cycle of the control. In this case, the deviation lateral speed Vlat may be calculated from the vehicle speed V and the relative-to-lane yaw angle θyaw of the own vehicle, as represented by the expression (5). In one alternative, the deviation lateral speed Vlat may be calculated as a time change of the lateral position of the own vehicle.

Figure 4:
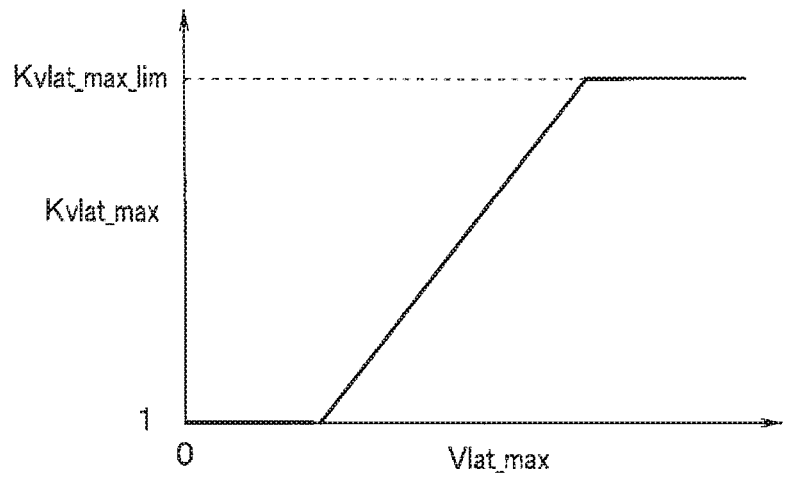
FIG. 4 is a diagram illustrating a characteristic example of a rate limit value correction gain versus a deviation lateral speed maximum value, according to the first implementation.

FIG. 4 illustrates a characteristic example of the rate limit value correction gain Kvlat_max versus the deviation lateral speed maximum value Vlat_max. In a region where the deviation lateral speed maximum value Vlat_max is small, the rate limit value correction gain Kvlat_max may be kept in a no-correction state (Kvlat_max=1). As the deviation lateral speed maximum value Kvlat_max becomes larger, the rate limit value correction gain Kvlat_max may be made linearly larger. Upon the deviation lateral speed maximum value Vlat_max being equal to or larger than a predetermined value, the rate limit value correction gain Kvlat_max may be limited to a set value Kvlat_max_lim (e.g., Kvlat_max_lim=1.5). Thus, the rate limit value Lim may be fixed to an upper limit value.

As described, in the case with the low deviation lateral speed Vlat, the speed of change in the target steering torque Tp may be limited to the rate limit value Lim according with the travel environment. Hence, it is possible to prevent the driver from having the sense of incongruity. Moreover, as the deviation lateral speed Vlat becomes larger, the rate limit value Lim may be made larger. Hence, it is possible to ensure the deviation prevention performance.

The target steering torque Tp_lim subjected to the rate limit processing in the rate limit processing unit 81 may be inputted to the range limit processing unit 83, to undergo the range limit processing. The range limit processing may include regulating an absolute value of the torque at a final stage of torque calculation from viewpoints of safety. Normally, a torque value is rarely limited by the range limit processing. Accordingly, the target steering torque Tp_lim subjected to the rate limit processing may be outputted as the instruction torque for the EPS motor 12.

Description now moves on to program processing related to the lane deviation prevention control as described above, with reference to flowcharts of FIGS. 5 and 6. The lane deviation prevention control is to be executed by the steering controller 50.

Figure 5:
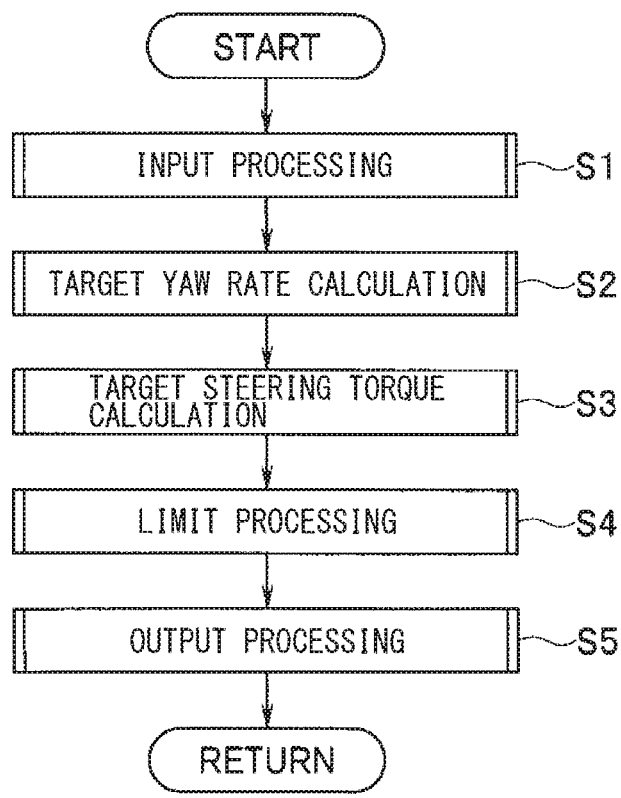
FIG. 5 is a flowchart illustrating an example of a routine of a lane deviation prevention control, according to the first implementation.

First, referring to the flowchart of FIG. 5, described is a main routine of the lane deviation prevention control. The routine of the lane deviation prevention control may be started in a case where a start condition of the lane deviation prevention control is satisfied. For example, assuming that the lane line on the left side in the traveling direction is a lane line as a target of deviation prevention, the start condition may include that the current relative-to-lane yaw angle θyaw of the own vehicle satisfies θyaw≥0, i.e., that the current relative-to-lane yaw angle θyaw is directed to the direction of deviation, and that the lane deviation estimated time Ttlc is equal to or smaller than the threshold Tth. The lane deviation estimated time Ttlc means the time it takes for the own vehicle to deviate from the lane. The threshold Tth may be decided by the vehicle speed V and the lane curvature κ.

In the routine of the lane deviation prevention control, first, in step S1, the steering controller 50 may perform input processing. The input processing includes inputting, for example, sensor signals, recognition information, and control information. For example, the steering controller 50 may input signals from the sensors and undepicted switches, the recognition information by the camera from the exterior environment recognition device 150, and the control information from other controllers through the communication bus 200. Non-limiting examples of the sensors may include the steering angle sensor 21, the torque sensor 22, the rotation angle sensor 23, the vehicle speed sensor 24, and the yaw rate sensor 25.

Thereafter, the routine may proceed to step S2. In step S2, the lane curvature turn target yaw rate γtgt_lane and the deviation prevention behavior generation target yaw rate γtgt_turn may be calculated as the target yaw rate. In step S3, the target steering torque Tp may be calculated. The target steering torque Tp is provided for achievement of the target yaw rate γtgt. The target steering torque Tp may be the addition of the feedforward torque Tp_ff_lane and Tp_ff_turn, and the feedback torque Tp_fb. The feedforward torque Tp_ff_lane and Tp_ff_turn may be obtained by torque conversion of the lane curvature turn target yaw rate γtgt_lane and the deviation prevention behavior generation target yaw rate γtgt_turn. The feedback torque Tp_fb may be based on the deviation between the target yaw rate γtgt and the actual yaw rate γ.

Figure 6:
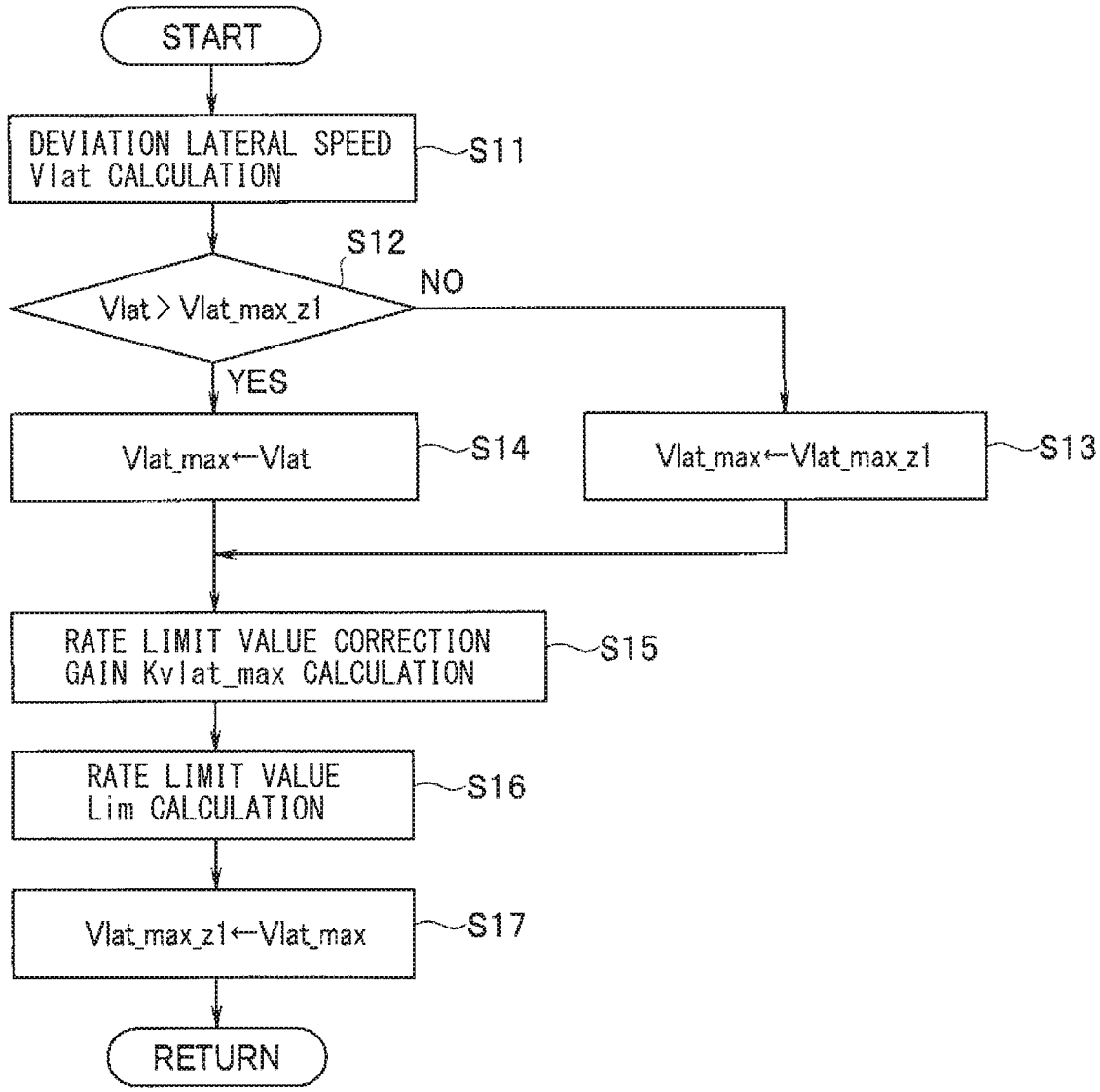
FIG. 6 is a flowchart illustrating an example of a routine of calculation of a rate limit value, according to the first implementation.

Thereafter, the routine may proceed to step S4. In step S4, the rate limit processing and the range limit processing may be executed. The rate limit processing may include limiting the speed of change in the target steering torque Tp to the rate limit value Lim. The rate limit value Lim may be calculated in a routine of calculation of the rate limit value, as illustrated in FIG. 6. The range limit processing may include regulating the target steering torque Tp within a safety limit. Thereafter, the routine may proceed from step S4 to step S5. In step S5, output processing may be performed. The output processing may include outputting the resultant torque, as the instruction torque, to the motor driver 20 that drives the EPS motor 12.

Description is given next of a routine of calculation of the rate limit value. The routine of the calculation of the rate limit value includes calculating the rate limit value Lim to be used in the rate limit processing in step S4 of the forgoing routine of the lane deviation prevention control.

In the routine of the calculation of the rate limit value, first, in step S11, the deviation lateral speed Vlat may be calculated on the basis of the vehicle speed V and the relative-to-lane yaw angle θyaw of the own vehicle. Thereafter, the routine may proceed to step S12. In step S12, a check may be made as to whether or not the deviation lateral speed Vlat calculated this time is higher than a currently-maintained previous value Vlat_max_z1 of the deviation lateral speed maximum value.

In step S12, in a case where the deviation lateral speed Vlat calculated this time is equal to or lower than the currently-maintained previous value Vlat_max_z1 of the deviation lateral speed maximum value (Vlat≤Vlat_max_z1), the routine may proceed from step S12 to step S13. In step S13, the latest deviation lateral speed maximum value Vlat_max may be updated with the currently-maintained previous value Vlat_max_z1 of the deviation lateral speed maximum value (Vlat_max←Vlat_max_z1). Thereafter, the routine may proceed from step S13 to step S15.

In step S12, in a case where the deviation lateral speed Vlat calculated this time is higher than the currently-maintained previous value Vlat_max_z1 of the deviation lateral speed maximum value (Vlat>Vlat_max_z1), the routine may proceed from step S12 to step S14. In step S14, the latest deviation lateral speed maximum value Vlat_max may be updated with the deviation lateral speed Vlat calculated this time (Vlat_max←Vlat). After updating the deviation lateral speed maximum value Vlat_max in step S14, the routine may proceed to step S15.

In step S15, the rate limit value correction gain Kvlat_max may be calculated on the basis of the latest deviation lateral speed maximum value Vlat_max. For example, the rate limit value correction gain Kvlat_max corresponding to the deviation lateral speed maximum value Vlat_max may be calculated, by the retrieval from the forgoing characteristic table illustrated in FIG. 4.

Thereafter, in step S16, the base limit value Lim_base may be calculated in accordance with the vehicle speed V of the own vehicle and the travel environment such as the lane curvature κ. The base limit value Lim_base may be multiplied by the rate limit value correction gain Kvlat_max, to calculate the rate limit value Lim. Thereafter, the routine may proceed to step S17. In step S17, the latest deviation lateral speed maximum value Vlat_max may be maintained as the previous value Vlat_max_z1 of the deviation lateral speed maximum value. Thus, the routine may be terminated.

As described, in the first implementation, the rate limit value is calculated in accordance with the deviation state of the own vehicle from the lane, e.g., the deviation lateral speed Vlat. Hence, it is possible to limit appropriately the speed of change in the target steering torque. Moreover, the base limit value Lim_base according with the travel environment of the own vehicle may be corrected on the basis of the deviation lateral speed Vlat of the own vehicle, to calculate the rate limit value Lim. Hence, it is possible to limit appropriately the speed of change in the target steering torque, while ensuring the deviation prevention performance and alleviating the sense of incongruity given to a driver.

Description is given next of a second implementation of the technology. In the second implementation, it is noticed that the higher the deviation lateral speed Vlat of the own vehicle becomes, the larger the relative-to-lane yaw angle θyaw becomes, resulting in longer control time involved in suppressing deviation while avoiding abrupt behavior changes. The longer control time causes longer time of duration of the rate limit processing. Thus, the second implementation may include allowing the rate limit value to be able to vary with the time of duration of the rate limit processing.

The rate limit value calculating unit 82 according to the second implementation may, therefore, change the processing according to the first implementation, and set a rate limit initial value Lim_start at a start of the rate limit processing, a time increment Lim_diff of the rate limit value, and a rate limit maximum value Lim_max.

The rate limit initial value Lim_start may be calculated on the basis of the vehicle speed V of the own vehicle and the lane curvature κ, as with the base limit value Lim_base in the first implementation. As the time increment Lim_diff, used may be, for example, a value acquired by running tests and simulation. In this implementation, the time increment Lim_diff may be a constant. Similarly, the rate limit maximum value Lim_max may be also set in advance as a constant.

The rate limit value Lim in accordance with the time of duration of the limit processing may be calculated, as represented by the following expression (16), by adding, to the rate limit initial value Lim_start at the start of the rate limit processing, an integration value of the time increment Lim_diff for a lapse of time from the start of the limit processing.

$$Lim = Lim\_start + \int Lim\_diff \, dt \quad (16)$$

The rate limit value Lim calculated by the expression (16) may be so limited as to keep its absolute value |Lim| from being larger than the rate limit maximum value Lim_max, in a case where a sign of the direction of deviation is taken into consideration. In other words, in a case where the rate limit value Lim is larger than zero (Lim>0), the rate limit value Lim may be limited to the rate limit maximum value Lim_max (Lim=Lim_max). In a case where the rate limit value Lim is smaller than zero (Lim<0), the rate limit value Lim may be limited to the rate limit maximum value of a negative sign (Lim=−Lim_max).

Figure 7:
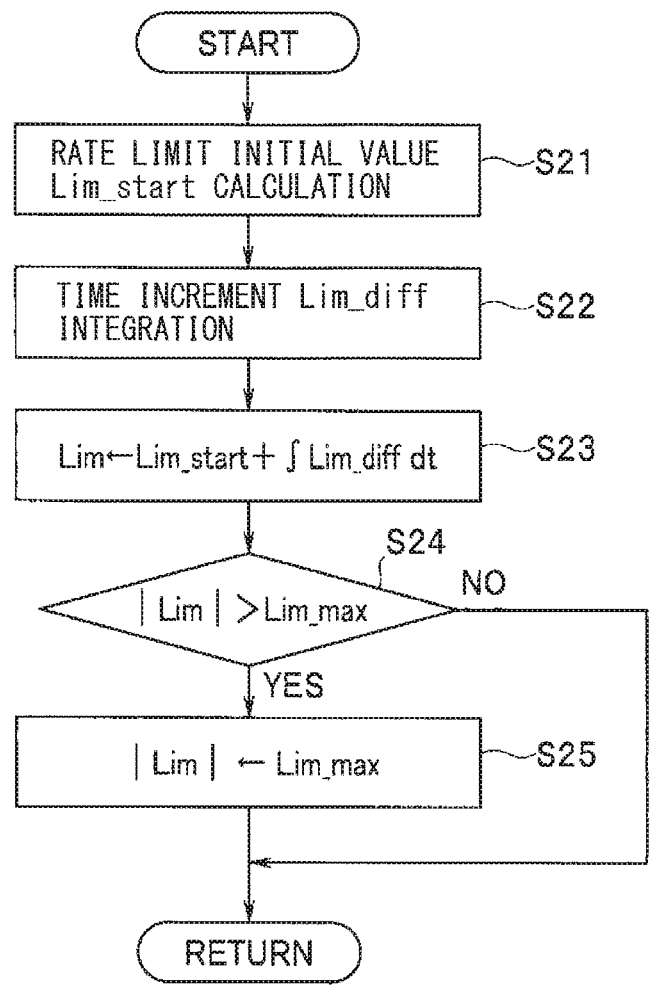
FIG. 7 is a flowchart illustrating an example of a routine of calculation of a rate limit value, according to a second implementation of the technology.

Description is given next of a routine of calculation of the rate limit value according to the second implementation, with reference to a flowchart of FIG. 7. In the routine of the calculation of the rate limit value according to the second implementation, first, in step S21, the rate limit initial value Lim_start may be calculated on the basis of, for example, the vehicle speed V of the own vehicle and the lane curvature κ.

Thereafter, the routine may proceed to step S22. In step S22, the time increment Lim_diff may be integrated on each control cycle, to perform integration of the time increment Lim_diff in accordance with the time of duration of the rate limit processing. Thereafter, the routine may proceed from step S22 to step S23. In step S23, the integration value of the time increment Lim_diff may be added to the rate limit initial value Lim_start, to calculate the rate limit value Lim.

Thereafter, the routine may proceed to step S24. In step S24, a check may be made as to whether or not the absolute value |Lim| of the rate limit value Lim calculated is larger than the rate limit maximum value Lim_max. In a case where the absolute value |Lim| is equal to or smaller than the rate limit maximum value Lim_max (|Lim|≤Lim_max), outputted may be the rate limit value Lim calculated in step S23. In a case where the absolute value |Lim| is larger than the rate limit maximum value Lim_max (|Lim|>Lim_max), the routine may proceed from step S24 to step S25. In step S25, the absolute value |Lim| of the rate limit value Lim calculated in step S23 may be limited to the rate limit maximum value Lim_max (|Lim|←Lim_max). Thus, the rate limit maximum value Lim_max may be outputted as the rate limit value Lim (Lim=Lim_max), or alternatively, the rate limit maximum value with the negative sign −Lim_max may be outputted as the rate limit value Lim (Lim=−Lim_max).

Figure 8:
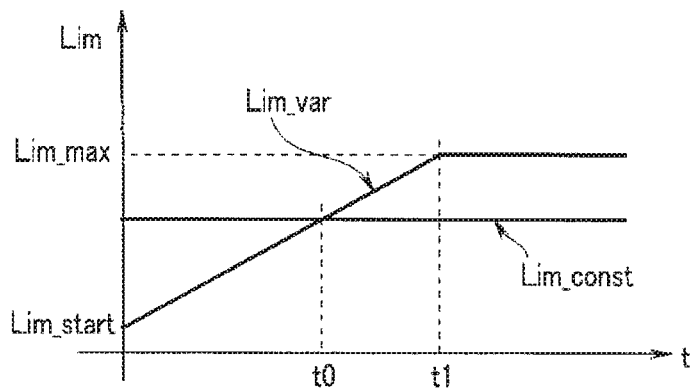
FIG. 8 is a diagram illustrating how the rate limit value varies, according to the second implementation.

FIG. 8 illustrates how the rate limit value Lim according to the second implementation varies with the lapse of time from the start of the rate limit processing, assuming that the rate limit value Lim is larger than zero (Lim>0). While a constant rate limit value is represented by a line Lim_constant, the rate limit value Lim according to the second implementation may be represented by a line Lim_var. The line Lim_var may increase, with a lapse of time t, from the rate limit initial value Lim_start with an inclination of the time increment Lim_diff, and cross the line Lim_const at time t0. At time t1, the rate limit value Lim according to the second implementation may become equal to the rate limit maximum value Lim_max (Lim=Lim_max). After time t1, the rate limit value Lim according to the second implementation may be limited to the constant rate limit maximum value Lim_max.

Figure 9:
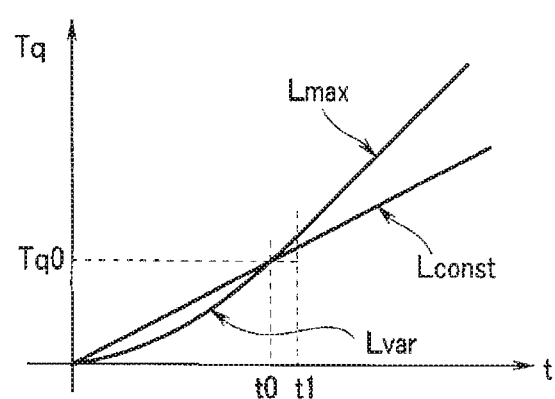
FIG. 9 is a diagram illustrating how the rate limit value varies on a coordinate plane having an axis of torque and an axis of time, according to the second implementation.

FIG. 9 illustrates how the rate limit value Lim varies on a coordinate plane having an axis of torque Tq and an axis of time t. Referring to FIG. 9, the rate limit value Lim may be represented by a combination of a curve Lvar and a line Lmax bordering at time t1. The speed of change in the target steering torque Tp may be regulated by the combination of the curve Lvar and the line Lmax. The rate limit value Lim, represented as a torque rate (Tq/t) at each point on the curve Lvar before time t1, may vary linearly by time integration with the time increment Lim_diff as a constant, as illustrated in FIG. 8. The curve Lvar in FIG. 9 may, therefore, make a quadratic curve. At and after time t1, the rate limit value Lim may be represented by the line Lmax having the rate limit maximum value Lim_max as an inclination. It is to be noted that the constant rate limit value represented by the line Lim_const in FIG. 8 is represented in FIG. 9 by a line Lconst having a constant inclination. At time t0, the curve Lvar and the line Lconst may cross each other.

The rate limit value according to the second implementation may vary with the lapse of time from the start of the rate limit processing. This makes it possible to make the rate limit value relatively small, in a region where the lapse of time is smaller than time t0 and the torque is smaller than torque Tq0 at an initial stage at the start of the rate limit processing, as compared to the constant rate limit value represented by the line Lconst in FIG. 9. Hence, it is possible to alleviate the sense of incongruity given to the driver. Meanwhile, in a region where the time of duration of the rate limit processing becomes longer, with the lapse of time being larger than time t0 and the torque being larger than the torque Tq0, it is possible to make the rate limit value relatively large, as compared to the constant rate limit value represented by the line Lconst. Hence, it is possible to enhance the deviation prevention performance.

As described, in the second implementation, the rate limit value may be able to vary with the time of duration of the rate limit processing. This makes it possible to make the rate limit value relatively small, in the case with the relatively low deviation lateral speed and the short time of duration of the rate limit processing. Hence, it is possible to alleviate the sense of incongruity given to the driver. Meanwhile, in the case with the relatively high deviation lateral speed and the long time of duration of the rate limit processing, it is possible to make the rate limit value relatively large. Hence, it is possible to enhance the deviation prevention performance. In other words, in the second implementation, as with the first implementation, it is possible to limit appropriately the speed of change in the target steering torque while ensuring the deviation prevention performance and alleviating the sense of incongruity given to the driver.

The steering controller 50 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the steering controller 50 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the steering controller 50 illustrated in FIG. 1.

Although the technology has been described in terms of exemplary implementations, it is not limited thereto. It should be appreciated that variations may be made in the described implementations by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A lane deviation prevention control device for vehicle, the lane deviation prevention control device comprising:
   a target steering torque calculator configured to calculate target steering torque to be applied to a steering system of an own vehicle in a lane deviation prevention control, the lane deviation prevention control including preventing the own vehicle from deviating from a lane on which the own vehicle is traveling;
   a rate limit processor configured to perform rate limit processing, the rate limit processing including limiting a speed of change in the target steering torque to a rate limit value; and
   a rate limit value calculator configured to calculate the rate limit value in accordance with a deviation state of the own vehicle from the lane, wherein the rate limit value calculator corrects a base value by a correction gain, to calculate the rate limit value, the base value being set in accordance with a vehicle speed of the own vehicle and a curvature of the lane, and the correction gain according with a maximum value of a lateral speed of the own vehicle with respect to the lane.

2. The lane deviation prevention control device for vehicle according to claim 1, wherein the rate limit value calculator calculates the rate limit value in accordance with a lateral speed of the own vehicle with respect to the lane.

3. The lane deviation prevention control device for vehicle according to claim 1, wherein the rate limit value calculator calculates the rate limit value in accordance with time of duration of the rate limit processing.

4. The lane deviation prevention control device for vehicle according to claim 1, wherein the rate limit value calculator adds an integration value to an initial value at a start of the rate limit processing, to calculate the rate limit value, the integration value being an integration of a time increment for a lapse of time from the start of the rate limit processing.

5. A lane deviation prevention control device for vehicle, the lane deviation prevention control device comprising circuitry configured to
- calculate target steering torque to be applied to a steering system of an own vehicle in a lane deviation prevention control, the lane deviation prevention control including preventing the own vehicle from deviating from a lane on which the own vehicle is traveling,
- perform rate limit processing, the rate limit processing including limiting a speed of change in the target steering torque to a rate limit value, and
- calculate the rate limit value in accordance with a deviation state of the own vehicle from the lane, wherein the lane deviation prevention control device corrects a base value by a correction gain, to calculate the rate limit value, the base value being set in accordance with a vehicle speed of the own vehicle and a curvature of the lane, and the correction gain according with a maximum value of a lateral speed of the own vehicle with respect to the lane.

* * * * *